Figure 1:
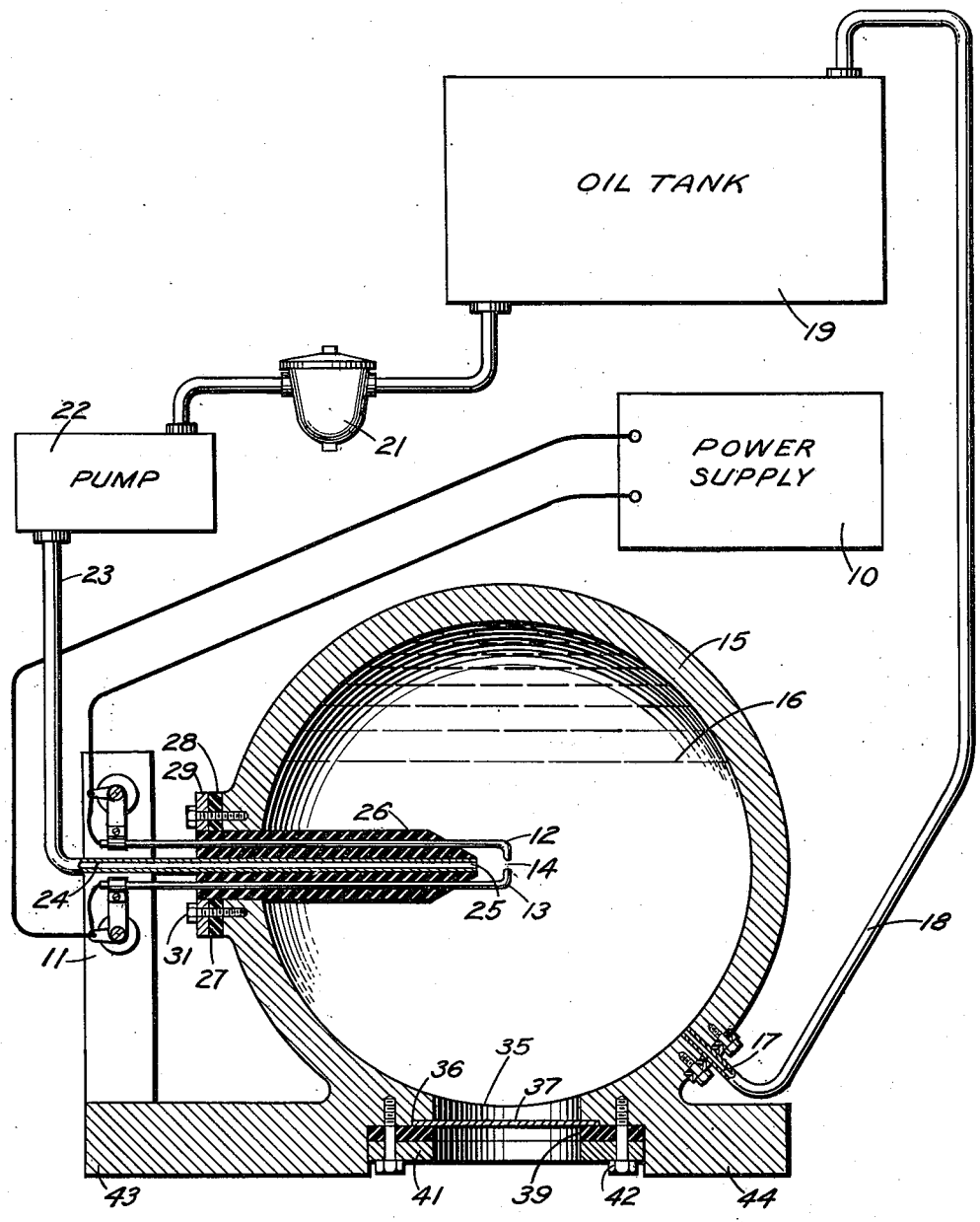

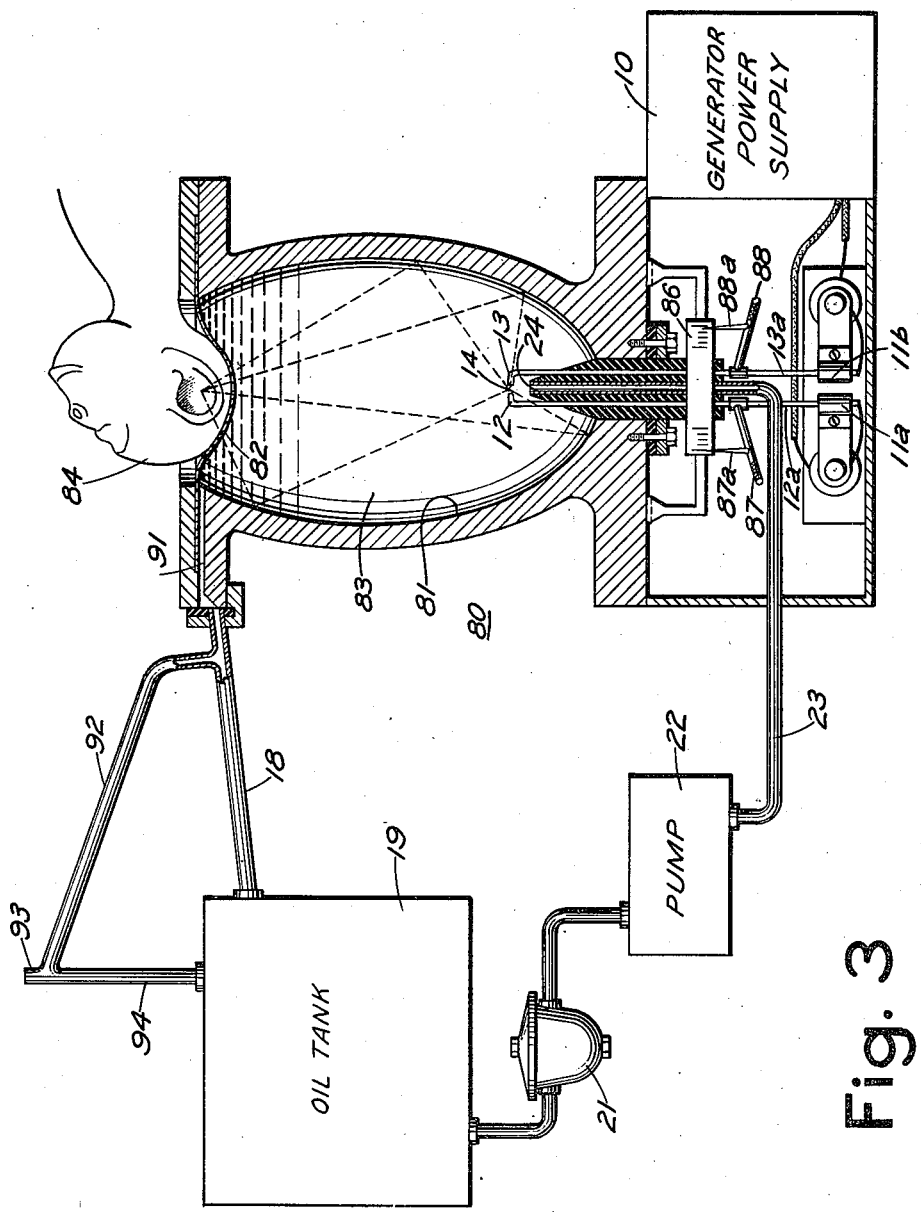

Patented July 3, 1951

2,559,227

UNITED STATES PATENT OFFICE 2,559,227

SHOCK WAVE GENERATOR

Frank Rieber, New York, N. Y., assignor to Interval Instruments, Inc., New York, N. Y., a corporation of New York Application May 24, 1947, Serial No. 750,217

4 Claims. (Cl. 128—24)

This invention relates to a method and apparatus for generating in a fluid medium an abrupt mechanical compression wave of relatively high intensity.

An object of the invention is to provide a source of elastic shock waves, which may be confined to an initial region of very small dimensions.

A further object of the invention is to provide means by which elastic shock waves, originating in a relatively small source region, may be conveniently radiated in a directional manner.

A further object of the invention is to provide means whereby elastic shock waves may be directed in a converging beam, towards a focal point, at which point the waves will exhibit extremely high intensity.

A further object of the invention is to provide means for generating elastic shock waves whereby each wave or wave train may be generated at a precisely controlled and predetermined instant of time.

Further objects of the invention will appear from the following disclosure.

In the past, it has been customary to generate elastic waves in fluids, for various purposes, by causing mechanical motion of a movable or vibratory part in contact with the said fluids. As an example of such generators, the various types of oscillators, used to generate trains of elastic waves under water, for signaling, depth sounding, or the detection of vessels and obstacles, may be considered.

Originally, waves of this sort were generated by causing vibrations of a diaphragm, in contact with the fluid, and driven by applying, at an appropriate point in the diaphragm, electromagnetically generated forces, a common arrangement being to attach to the diaphragm a moving coil, located in the air gap between the poles of a magnet. The electrical wave trains or pulses that passed through the coil, resulted in generating mechanical wave trains for propagation through the fluid in contact with the diaphragm.

Devices of this sort were incapable of operation at extremely high frequencies. Nevertheless, high frequency operation would provide certain advantages for many purposes. Accordingly, for operation at high frequencies, other generating means were adopted later. In one system, the moving part was driven by forces derived from the expansion and contraction of a solid body, such as a piezoelectric crystal, on which suitable wave trains of electrical potential were imposed. In another system, the drive was obtained from cores of electromagnetic material exhibiting the property of magneto-striction, these cores being magnetized by electrical currents derived from electrical wave trains of suitable characteristics.

By such means, it has been found practical to generate and to radiate into fluids elastic wave trains of a very high frequency. However, to get any energy into such a wave train, it is necessary that the impulse have a considerable duration, measured in cycles of vibration, since it is not practical to increase, indefinitely, the amplitude of the individual cycles, without reaching a limit imposed by a cavitation, or separation of the diaphragm from the fluid on the rarefaction half of the cycle.

For this same reason, it has not been found practical to reduce the dimensions of the source of such wave trains, while still retaining a high energy content, without reaching the cavitation limit in a similar fashion.

Neither has it been possible to radiate a single simple pressure pulse, or a sharp pressure pulse followed by a brief train of transient phenomena, by the use of mechanically displaceable devices of the electromagnetic, piezo-electric, or magnetostrictive type, since all of these devices are definitely limited either as to the instantaneous energy which can be converted from the electrical into the elastic form, or, otherwise, are subject to inherent limits as to the total amplitude of motion which the displaceable body may undergo when electrically excited.

For certain purposes, it is found that the production of a single sharp pressure wave, followed by a transient series of minimum extent, has advantages over any possible semi-sustained series of waves.

Such pressure pulses may be produced by providing:

A body of fluid of high dielectric strength;

A pair of electrodes, located in this fluid, and so mounted and spaced as to form a suitable spark or discharge gap, which may be adjustable or otherwise controlled to determine the instant of discharge;

An electrical condenser, of relatively high capacity and capable of sustaining a relatively high voltage charge;

A charging source for placing upon the condenser a charge of predetermined and suitable magnitude;

A suitable container for the insulating fluid, at least part of the boundary wall of said container being in contact with other fluid or solids, into which it is desired to radiate elastic wave impulses;

Material for the walls of the container in which the dielectric fluid is placed, adapted to reflect a high percentage of incident elastic wave energy back into the dielectric fluid, whereby it becomes possible to shape the said fluid container so as to act also as a reflector or concentrator of elastic waves, adapted to direct the pressure pulse in some predetermined direction, or towards some predetermined focal point; and Means for maintaining a circulation of the insulated fluid through the spark gap, whereby fresh fluid of high insulating properties may be continually supplied to the spark gap region. Such fresh supply may be filtered and reconditioned fluid that has been subjected to previous destruction by other sparks.

If it is wished to radiate wave trains, that may be done by generating the pressure pulses within a container whose walls are substantial reflectors of the impulses, and, by placing the spark gap in a suitable position in the said container, a train of resonant vibrations may be excited therein. If a small portion only of the wall of this container is permeable to pressure pulses, and in contact with an external fluid, the rate of radiation of pressure pulses may be controlled so as to generate wave trains of variable and predetermined characteristics.

A highly important use of the invention lies in the field of medicine. Experiments, made in recent years, indicate that elastic waves are capable of exerting a considerable influence on living tissue. This influence is, naturally, more readily confined to sharp local regions, when the frequency of the elastic waves is high enough to permit directional and focused radiation.

Among other effects, it has been found possible, by focusing a sufficient amount of energy at high vibratory frequencies upon a small region, to destroy living tissue.

This destructive effect, in accordance with previous observations, usually consists to a considerable extent in heating of the tissues locally, with absorption of elastic energy, as the tissues themselves have a high internal mechanical hysteresis.

In addition to this heating effect, observed in connection with sustained wave trains of high frequency, it is possible to cause tissue destruction by focusing an intense pressure wave into the region to be destroyed. This wave, upon passage through such region, will be followed by a rarefaction wave, due to the elastic rebound of the intensely compressed material. Where this rarefaction wave exceeds the sum of the normal pressure existing in the medium and the unit tensile strength of the tissue, rupture must occur.

By the use of the invention it is possible to produce intense local focused pressure waves, which, in the vicinity of the focal point, attain a magnitude sufficient to cause these rupturing effects, and the consequent destruction of tissue.

A further effect, useful in medical work, which can be produced by the invention, is the exploration or stimulation of various parts of the nervous system, for the purpose of defining or outlining the location of such parts. This may be accomplished by the use of extremely small spark gaps and low electrical intensities applied thereto, thereby causing the radiated pressure pulses to be of a magnitude less than that required for the rupture of tissue.

Figure 2A:
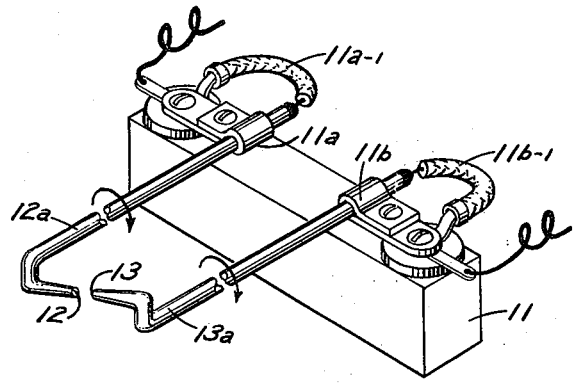
Figure 2B:
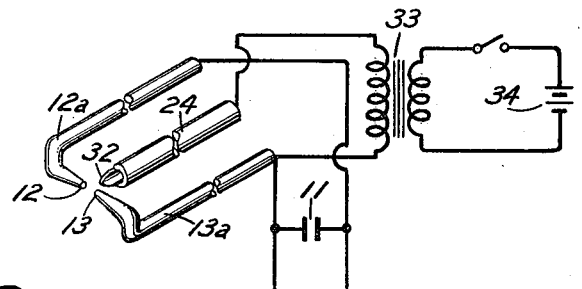

The manner in which the invention may be practiced in the various fields of application referred to, as illustrated in the accompanying drawing in which:

Fig. 1 is a schematic view of a system including a resonating pulse-generator, embodying the invention, and shown in a transverse sectional view;

Fig. 2—a is a perspective view of the spark gap electrodes and illustrates the manner in which the length of the gap may be varied by angular adjustment of the electrode supports;

Fig. 2—b is a perspective view similar to Fig. 2—a, with a pilot gap element schematically indicated to initiate a discharge across the gap;

Fig. 3 is a similar view of a system including a wave generating device suitable for operation in the field of medicine, and in which a very highly directive control is utilized.

As shown in Fig. 1, a system in accordance with this invention includes generally a source of electrical energy 10, to supply energy to a suitable energy storage device such as a condenser 11, from which the stored energy is supplied under predetermined conditions to two electrodes 12 and 13 set up to form a spark gap 14 within an enclosing housing 15, which is also filled completely with a fluid medium 16, such as oil, having a high dielectric constant. The oil 16 is arranged to be circulated from the container 15 through a circulating system including an outlet or drain pipe 17, a conduit 18, a reserve tank or reservoir 19, a filter 21, a circulating pump 22 and supply conduits 23 and 24 and jet 25 in order to cleanse the gap and remove therefrom any particles of carbonized material that might have been formed in the gap or in the region of the gap by a previous electrical discharge across the gap.

As shown in Fig. 2—a, the electrodes 12 and 13 are respectively supported on the front ends of electrically conducting electrode shafts 12—a and 13—a, that are electrically connected to the condenser terminals through strap connectors 11—a and 11—b. The gap electrodes 12 and 13 are arranged to be adjustably positioned to desired gap spacing by angular adjustment of the electrode shafts 12—a and 13—a, around their respective longitudinal axes. The strap connectors to the condenser terminals are temporarily loosened to permit such angular adjustment of the electrode shafts 12—a and 13—a, and are then re-tightened to reclamp the electrode shafts in their newly adjusted positions.

The connections from the condenser 11 to the spark gap electrodes 12 and 13 should be such as to minimize the inductance of the circuit including the condenser and the gap electrodes, by minimizing the sectional area outlined by the conductors of that circuit. The strap connectors are therefore disposed to lie close to the top of the condenser housing with the electrode shafts preferably disposed in the same plane, so that only the area of the space between the electrode shafts contributes to the inductance of the discharge circuits. The inductance of the discharge circuit is thus held to a minimum having due regard to the physical spacing required for insulation at the substantial voltages that may be employed.

In one modification a condenser of one microfarad and a voltage up to 15,000 have been employed. The condenser capacity and the voltage to be used may be varied for economic balance. The size of the container and the electrode spacing also will determine the amount of energy that can be handled.

The effectiveness of the energy stored in the condenser would depend upon the rate of utilization, which, in turn, would depend upon the rate of supply of that energy to the spark gap.

Such rate of supply to the spark gap is the rate of discharge of the condenser, and is a transient condition determined and controlled by the time constant of the spark gap circuit.

The gap breakdown makes the gap circuit practically a short-circuit on the condenser, due to the small resistance of arc in the gap. Since the inductance and the resistance introduced by the electrode shafts in circuit with the gap is also small, the discharge time is of the order of microseconds, and the stored energy of the condenser is supplied to the gap in that short time interval, thus making the energy transfer rate extremely high.

Since the effectiveness of the gap is a function of the time rate of energy absorption and its subsequent transformation, such effectiveness is maximized by the reduction of the resistance and inductance of the circuit to a minimum. The time constant of the spark gap circuit is thus kept exceedingly small and the rate of energy transfer is made correspondingly exceedingly large.

An important feature of the present invention is therefore to provide a transfer circuit between the condenser and the gap which has a minimum amount of resistance and inductance, and a very small time constant.

The electrodes 12 and 13, being of highly conductive materials, such as copper or brass, are mounted on an insulator 26, which is shown supported as a cantilever at one end on the wall of the container 15. A suitable leak-proof seal 27 is provided on the outer surface of the wall of the container around the outer end of the insulator 26, being shown as including a washer 28 of compressible oil-resistant material, and a backing washer 29 of metal. Suitable anchoring screws 31 clamp the seal 27 in place.

For the sake of simplicity, the electrodes 12 and 13 and the conduit 24 are illustrated as being frictionally inserted in the insulator 26 so that leakage is substantially prevented.

The conduit 24 may be of metallic material or may merely constitute a central axial passage in the insulator 26. However, in order to control the instant of discharge across the main gap, between electrodes 12 and 13, an auxiliary or pilot gap may be provided through the use of an auxiliary or starting electrode 32. Where a control conduit 24 of metal is used, a small tip on its forward end or nozzle may serve as the starting electrode 32 in Fig. 2—b. A suitable voltage may be applied between the starting electrode and one of the main electrodes, to establish a starting discharge and ionize the main gap, or the stress in the main gap may be concentrated by the electrostatic effect from the pilot or starting electrode.

To establish the starting voltage at the auxiliary or pilot gap electrode 32, an ignition type transformer coil 33 may be excited by a voltage pulse applied to the primary from a steady source of voltage, indicated, for simplicity, as a battery 34, in Fig. 2—b.

In order to transmit a pressure-pulse from within the container 15, through the wall to the outside of the container, a suitable window 35 is provided at a selected region of the wall. A slightly longer co-axial recess on the outer part of the wall provides a shoulder 36 for receiving a thin closing disk or diaphragm 37 that is permeable to pressure within the container. The diaphragm 37 is anchored around its rim onto the shoulder 36 to prevent leakage from the container 15, but is otherwise sufficiently resilient and yielding to transmit any pressure-waves from within the container, without offering excessive resistance or opposition to such pressure-waves. Suitable anchoring means for the diaphragm is indicated as a compressible leak-preventing washer 39 tightly pressed in position against the shoulder 36 by a metal backing annular washer 41 anchored in position by suitable screws 42.

Two flanges 43 and 44 are provided on the container 15 adjacent the window 35, and they serve as the means by which the container 15 may be secured in place, wherever desired, with the diaphragm in contact with a second fluid medium into which the pressure-waves are to be transmitted, after transmission from the generator through its window 35 and the diaphragm 37.

In order to control the maximum amplitude and the duration of the wave of the energy train, suitable control means may be included in what is designated as the power supply and control means 10. Thus the amplitude of a voltage as applied to the condenser 11 may be controlled to assure the correct energy charge desired in the condenser. Such controls will include suitable means for applying an appropriate voltage to the condenser; suitable impedance means in the condenser and spark-gap circuit to vary the time constant of the circuit, and thereby control the discharge rate, if desired; and suitable means to control the time intervals between successive energizations of the condenser for successive pulse generations. The pilot gap elements will control the instant of breakdown of the main gap, and thus compensate for any displacements of the main electrodes 12 and 13 from initial spacings due the rupturing force of each discharge at the main gap. To provide substantial support for the main gap electrodes for those operating conditions, the supporting insulator is brought out as close as possible to the gap electrodes.

In Fig. 1, for simplicity of illustration, the insulator support 26 and the electrodes 12 and 13 are shown with the gap in alignment with the vertical axis through the window 37. Normally the gap and the supporting insulator will be rotated 90° from the position shown, so the gap will be transverse of the vertical axis through the window.

By means of a pulse generator of the form shown in Fig. 1, a wave train may be obtained in which the initial wave carries a substantial part of the energy supplied to the gap. A resonance condition is established within the container, and the energy thus stored in the medium is supplied to the window or diaphragm 37 in a train of energy pulses for transfer to the external medium at the diaphragm. The energy wave train thus includes the first main energy pulse and a series or train of successive energy pulses.

The material of the container wall and the condition of the wall surface are such that the surface is highly reflective. For example, highly polished metal, such as tempered steel, would be quite suitable. If the spark gap is exactly in the center of the sphere, only that amount of energy will be radiated on each successive vibration which corresponds to the amount which would be diffracted into the exit port at the wave length determined by the dimensions of the container and the characteristics of the medium. If the spark gap is slightly off center, resonance will be less sharp, and energy may be radiated at a slightly increased rate.

In the operation of the system, the condenser 11 will be charged to the appropriate voltage selected. That voltage alone may be utilized to effect a breakdown in the spark gap 14, or the auxiliary pilot gap may be employed, as shown in Fig. 2—b.

When an arc or electric discharge occurs between the terminals of the two electrodes 12 and 13, some of the oil in the spark gap and in the immediate vicinity of the spark gap may be carbonized. In order to restore and maintain the high dielectric strength in the spark gap, the oil used in the container 15 is filtered and returned through the system as shown, to remove the carbonized particles from the vicinity of the gap 14 by the filter 21. Due to its high dielectric character, the oil will act to dampen out a wave train by limiting the discharge in the gap to the initial wave. The action of the pilot gap may be limited to a single pulse by the collapse of the coil field, for example, to a resistor or a condenser at the coil switch. The coil switch may be variously controlled of course to establish the type of pulses desired at the pilot gap.

In order that the sudden generated pressure may not be dissipated in forcing a large quantity of the oil 16 out of the container into the circulating system to the oil tank, a relatively narrow constricting passage may be provided somewhere in the system between the container and the oil tank, being illustrated for convenience as being located in the exhaust or drain pipe connection 17. A similar constricting passage may be located between the pump and the container, if the pump construction is not such as to provide adequate reaction pressure.

The construction and assembly and mounting of the integral spark gap unit are such as to permit easy and simple withdrawal for the purpose of inspection and readjustment of the spacing of the electrodes where necessary. The entire unit may then be very easily re-inserted into the container after such an operation. As mentioned above, the energy from a unit of the type shown in Fig. 1 may constitute a train of wave pulses.

Fig. 3 is shown an application of the wave generating system with a generator of special design for concentrating pressure forces in selected small regions in living tissue of human or of animal bodies.

As shown in Fig. 3, the control system is generally similar to that already shown in Fig. 1, with the wave-generator 80 shown as being substantially in the form of an ellipsoidal shell, with its inner surface constituting a surface of revolution of an ellipse rotated about its longitudinal axis. In this construction, advantage is taken of the fact that rays emanating from one focal point of an ellipse will be reflected from the curve of the ellipse and caused to re-focus at the other focal point of the ellipse.

The spark-gap unit is therefore so disposed that the spark-gap 14 will substantially occupy and enclose the lower focal point of the ellipsoidal shell. Pressure force waves generated upon breakdown of the spark-gap 14 by an electrical discharge will therefore be directed by the inner surface of the container and transmitted by the medium toward the upper focal point, just beyond a pressure transmitting element 82, which consists of a relatively flexible membrane. The membrane should transmit pressure forces with a minimum absorption of energy and may consist of a plastic sheet that may be easily changed in shape to accommodate a body of variable contour, such as a human head. As in the previous modifications, this container 80 is also completely filled with the fluid medium 83, such as oil, so that complete surface contact is established between the oil 83 and the inner surface of the thin membrane 82, to insure the presence of a relatively non-compressible medium in contact with the membrane surface at all points or areas of contact between the membrane and an object, shown for example as a head 84. Air pockets are thus provided which would serve as pressure-absorbing media and would prevent the transmission of a substantial part of the pressure force to the membrane 82.

In the arrangement that is illustrated, the diaphragm, or membrane, is located below the upper focal point, so that focal point will be at a point somewhere within the object, such as the skull of a head, as shown resting against the membrane 82. The membrane 82 should have a maximum degree of flexibility while at the same time having a minimum-pressure absorbing quality. The membrane should therefore preferably be of the nature of a flexible plastic element, rather than of rubber, and should be easily conformable to the shape of a body, such as the head, when the latter is pressed against the membrane.

The adjustment for the spark-gap is illustrated as consisting of a calibrated ring 86 including appropriate vernier settings so the electrodes may be variably adjusted to desired gap spacings according to the power to be supplied to the gap.

The strap connectors 11—a and 11—b are loosened to release the electrode shaft 12—a and 13—a. The shafts may then be rotated by handles 87 and 88 attached thereto and movable adjacent the vernier scales to indicate the gap spacing by pointers 87—a and 88—a. After the proper gap spacing is set up, the shafts are fixed in position by retightening the clamps 11—a and 11—b.

The parts of the system external to the shell are similar to those previously described, and include the source of power supply for energizing the condenser to a voltage of proper amplitude sufficient to cause the breakdown of the spark-gap 14, or for causing the breakdown by a pilot gap, and the oil filtering system. The circulating system for the oil is similar to that previously shown and includes the reservoir or oil tank 19 which feeds into a filter 21 and thence to the pump 22 which supplies the oil to a feed conduit 23 and into the nozzle 24 to direct the oil stream into the spark-gap 14 to de-ionize the spark gap region and to remove from that spark gap region any carbonized particles formed by the reaction of the high temperature spark on the oil. The oil is withdrawn from the shell 80 at the top level directly underneath the inner surface of the membrane 82 so that any air that might have gotten into the vessel 82 will be removed with the oil by such circulation thereof. The oil and air are forced out of the shell 80 through an outlet passage 91 and directed into the outlet conduit 18. A bypassing conduit 92 permits any air trapped in the oil to be released to an appropriately disposed air-vent 93 at a level above the top level of any oil in the system. The air-vent is similarly connected by an air-vent tube 94 to the oil tank to permit any air in the oil tank to escape. The top level of the oil in the tank is only slightly below the top oil level in the shell, and the difference in level is maintained by the pump pressure.

The power supply 10 is similar to that in the previous modifications, for energizing the condenser to desired voltage and at desired intervals. In those constructions where the electrode shafts are adjustably mechanically connected at the straps to the condenser terminals, those electrode shafts are additionally connected to the condenser terminals through flexible electrical conductors 11—a—1, 11—b—1 so that the shafts are not entirely dependent upon the strap connections and are therefore not affected by any resistance that might be introduced into the transfer circuit by reason of a poor electrical connection due to a film of extraneous material between the strap and the electrode shaft. The flexible conductors are short and covered by suitable insulation in view of the high voltages that are involved. As previously indicated, a condenser as large as one microfarad charged to a voltage of 15,000 volts has been utilized to energize the device shown in Fig. 3. The range of voltage and the size of the condenser that may be employed are dependent upon the nature of the use that is to be utilized to destroy tissue or merely to stimulate it.

What is claimed for this invention is:

1. Apparatus for treating living tissue by elastic wave pressure forces, which utilizes a system for generating an abrupt mechanical compression wave, comprising a source of electrical energy; a condenser to be energized from said source; means for controlling the quantity and frequency of charge of the condenser from said course; and a compression wave generator consisting of a closed vessel filled with a fluid medium of high dielectric constant and enclosing a pair of electrodes spaced to constitute a spark gap that is to be energized from the condenser to effect a discharge across the gap and thereby generate a pressure surge; a portion of the enclosing vessel consisting of a plastic sheet conformable to an external body, over a substantial area of the sheet, and serving to transmit to such external body a pressure surge generated within the vessel by a discharge across the spark gap, said vessel having its inner surface shaped to constitute a surface of revolution having two focal points, with the gap between the electrodes disposed about one focal point, and with the vessel and the sheet of such size as to permit the external body to be disposed within the outline of the inner vessel to locate a selected point of the external body at the second focal point.

2. Apparatus for treating living tissue by elastic wave pressure forces, which utilizes a system for generating an abrupt mechanical compression wave, comprising a source of electrical energy; a condenser to be energized from said source; means for controlling the quantity and frequency of charge of the condenser from said source; and a compression wave generator consisting of a closed vessel filled with a fluid medium of high dielectric constant and enclosing a pair of electrodes spaced to constitute a spark gap that is to be energized from the condenser to effect a discharge across the gap and thereby generate a pressure surge; a portion of the enclosing vessel consisting of a plastic sheet conformable to an external body, over a substantial area of the sheet, and serving to transmit to such external body a pressure surge generated within the vessel by a discharge across the spark gap; said vessel having its inner surface shaped to constitute a surface of revolution having two focal points, with the gap between the electrodes disposed about one focal point, and with the vessel and the sheet of such size as to permit the external body to be disposed within the outline of the inner vessel to locate a selected point of the external body at the second focal point and means disposed outside of the closed vessel for adjusting the dimensions and the location of the spark gap within the vessel.

3. A system for treating living tissue by elastic wave pressure forces, comprising a source of electrical energy; an energy storage device for receiving electrical energy therefrom and for storing the energy, and capable of quickly releasing such stored energy; an energy-translating device for receiving the stored energy and capable of translating such received energy into another form in an extremely short time interval; an energy-transmitting medium subject to the influence of the energy-translating device, said medium serving to absorb from said device and to transmit an initial concentrated energy pulse, and serving thereafter as a quenching medium to limit any transient effects following the initial pulse; an enclosing container for the energy-translating device and the surrounding medium, said container having its inner surface shaped to constitute a surface of revolution of a geometrical curve having two focal points one of which serves as one focus for the inner surface of the container, with the energy-translating device being so disposed in the container that the one focus of the container defines the zone at which the translating device converts the energy which it receives into an electric arc, whereby the pressure force thus generated at the focus travels to the inner surface of the container and is thereafter directed according to the curvature of that inner surface, to the second focus at which is located the selected point in the living tissue.

4. A system for treating living tissue by elastic wave pressure forces, comprising a source of electrical energy; an energy storage device for receiving electrical energy therefrom and for storing the energy, and capable of quickly releasing such stored energy; an energy-translating device for receiving the stored energy and capable of translating such received energy into another form in an extremely short time interval; an energy-transmitting medium subject to the influence of the energy-translating device, said medium serving to absorb from said device and to transmit an initial concentrated energy pulse, and serving thereafter as a quenching medium to limit any transient effects following the initial pulse; an enclosing container for the energy-translating device and the surrounding medium, said container having its inner surface shaped to constitute an ellipsoid, with the energy-translating device being disposed in the container at one focus of the container whereby that focus defines the zone at which the translating device converts the energy which it receives into an electric arc, and the pressure force generated at the focus travels to the inner surface of the container and is directed therefrom to the other or receiving focus; and a diaphragm closure at the end of the container adjacent the receiving focus and movable into the container inside of the receiving focal point to permit an external body that is to be treated to be adjustably and selectively disposed against the outside of the diaphragm closure to locate a selected tissue area or zone at the receiving focal point of the container.

FRANK RIEBER.

REFERENCES CITED

The following references are of record in the file of this patent:

UNITED STATES PATENTS

| Number | Name | Date |
|---|---|---|
| 2,167,536 | Suits | July 25, 1939 |
| 2,283,285 | Pohlman | May 19, 1942 |
| 2,403,990 | Mason | July 16, 1946 |
| 2,448,372 | Horsley | Aug. 31, 1948 |

FOREIGN PATENTS

| Number | Country | Date |
|---|---|---|
| 654,673 | Germany | Dec. 24, 1937 |